United States Patent [19]

Lebreton

[11] 3,786,894
[45] Jan. 22, 1974

[54] ACOUSTIC SOUNDING INSTRUMENT
[75] Inventor: Francisque Lebreton, Paris, France
[73] Assignee: Institut Francais du Petrole des Carburants et Lubrifiants, Rueil-Malmaison, Hauts-de-Seine, France
[22] Filed: Sept. 21, 1971
[21] Appl. No.: 182,458

[30] Foreign Application Priority Data
Sept. 21, 1970 France .............................. 70.34200

[52] U.S. Cl. ........... 181/.5 BE, 181/.5 P, 181/.5 ED
[51] Int. Cl. .............................................. G01v 1/40
[58] Field of Search .... 181/.5 BE, .5 R, .5 P, .5 ED; 310/8.6; 340/10

[56] References Cited
UNITED STATES PATENTS
2,595,241  5/1952  Goble ......................... 181/.5 BE
3,511,334  5/1970  Zemanek ..................... 181/.5 BE OTHER PUBLICATIONS
Brush Electronics Co., "Piezotronic Technical Data," p. 4, 1953.

Primary Examiner—Benjamin A. Borchelt
Assistant Examiner—J. V. Doramus
Attorney, Agent, or Firm—Craig et al.

[57]  ABSTRACT

Acoustic sounding instrument for use in determining the acoustic characteristics of the terrain of a borehole includes at least one acoustic emitter and at least one acoustic receiver disposed with the mean cross-sectional planes thereof disposed essentially parallel to the axis of the borehole, the emitter and receiver each being provided with a surface which is essentially a cylindrical surface of revolution through which the waves are emitted and received, respectively.

4 Claims, 11 Drawing Figures

PATENTED JAN 22 1974  3,786,894

PATENTED JAN 22 1974 3,786,894

ACOUSTIC SOUNDING INSTRUMENT

The present invention relates to an acoustic sounding or probing instrument designed for receiving data pertaining to the acoustic characteristics of the terrain traversed by a borehole during a drilling operation.

The presently available equipment providing for the transmission and reception of acoustic waves make use of pairs of emitter-receivers immersed in the liquid which generally fills the borehole, this liquid serving as a medium for transmitting the acoustic waves and being indispensable to the receipt of a signal by the receiver after having traversed the terrain in question which has an amplitude sufficient to allow for the detection thereof.

The emitter and the receiver are generally placed in an enclosure made of rubber and filled with oil so that the emitter and the receiver will in no case touch the wall directly.

As a first approximation, the borehole may be considered as a cylinder of revolution. The emitter and the receiver having a low height (for example, 2 to 3 centimeters) with respect to the diameter thereof (which is in the order of from 8 to 10 centimeters) have an active surface with an essentially cylindrical configuration and a central axis which is customarily placed in coincidence with that of the borehole. This active surface emits waves which, after arriving on the wall of the borehole, can be compared to the spherical waves centered on the axis of the emitter only insofar as the emitter is centered in the borehole and has a small dimension as compared to the cross section of the borehole. Inasmuch as these conditions are not met in actual practice because of the dimensions required for the emitter at the usual emission frequencies and energy, the active surface of the emitter emits in fact non-directive waves issued from points situated on the lateral wall of the emitter cylinder.

Since the signals are emitted in the form of separate impulses, one measurement is carried out for each impulse, and for each measurement one beam of acoustic rays having a specific angle of incidence on the wall of the hole, as a function of the nature of the terrain, is utilized; while, the rays whose angle of incidence is different will not arrive at the receiver at all.

Under these conditions, points on the wall of the shaft are coincident in phase over a height equal to the height of the emitter cylinder, this height being intersected by the beam of parallel rays. Inasmuch as this height is not negligible with respect to the wave length transmitted in the terrain parallel to the wall, there are produced disturbing interferences in the transmission, and these interferences are accentuated at the receiver, irrespective of the nature of the terrain at the level of the receiver.

These defects, which become particularly apparent when one examines the general aspect of the signal being received, will be aggravated when the hole is not in revolution, and/or when the distribution of the characteristics of the terrain does not display a symmetry of revolution around the axis of the hole, and/or when the axis of the sounding or probing tool does not coincide with that of the hole, which increases the phase shift at the receiver.

These drawbacks (except for the sensitivity to a dissymmetry of distribution of the acoustic characteristics of the terrain around the axis of the hole) are encountered again when acoustic transducers (emitters and receivers) are used whose emitting or receiving surface is constituted principally of a plane face of the transducer, for example, the metallized end face of a ceramic cylinder.

These defects are eliminated according to the present invention with the aid of a sounding instrument comprising at least one acoustic emitter and at least one acoustic receiver which are spaced with respect to each other, the emitter comprising an active element emitting in the ground acoustic signals principally following the radial directions of a surface having an essentially cylindrical body of revolution, and the receiver receiving principally the acoustic signals following the radial directions of the surface having an essentially cylindrical configuration, this sounding or probing instrument as proposed being characterized in that the aforementioned cylindrical emitting surface and the aforementioned cylindrical receiving surface have the mean cross-sectional planes thereof disposed essentially following the same longitudinal plane of the sounding or probing instrument.

According to one embodiment of the sounding instrument proposed by the present invention, which is adapted to dip angle measurements of the layers of ground, the sounding or probing instrument comprises three emitters at a first level thereof and three receivers at a second level thereof, and the aforementioned mean cross-sectional planes of the emitters and of the receivers are disposed essentially along three planes forming therebetween angles of 120°. Obtained thereby is an acoustic dip-angle meter; in other words, a dip-angle meter whose operation does not require the use of the mud or sludge for conducting the electricity, which is in contrast to conventional dip-angle meters.

In a sounding instrument such as proposed by the present invention, there will be used advantageously acoustic transducers whose active element is a cylindrical ring secured along the axis thereof between two circular plates or supports with the interposition of annular fluid-tight seals.

The present invention will now be described hereinafter in a more detailed fashion with reference to the accompanying drawings, wherein.

Figure 1:
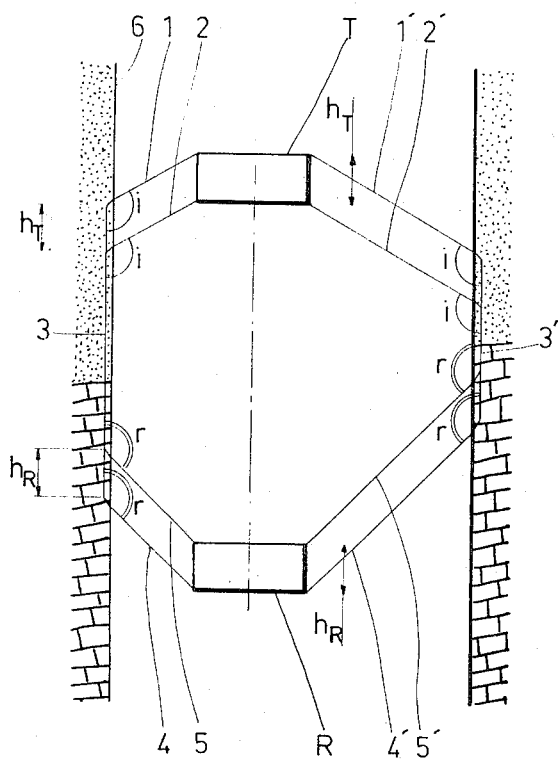
FIG. 1 is a schematic diagram of a type of sounding or probing instrument used in the prior art.
Figure 1A:
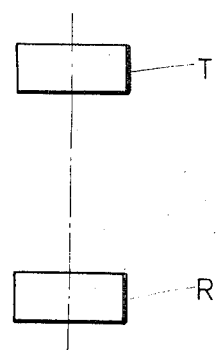
FIG. 1A is a vertical cross-sectional view through the device shown in FIG. 1.

In FIGS. 1 and 1A, which represent very schematically an arrangement adopted in the prior art for use as an acoustic sounding or probing instrument, reference symbol T designates the emitter while reference symbol R represents the receiver, and these acoustic transducers, which are spaced with respect to each other, can be provided in any number.

The wall of the well is designated with reference numeral 6. The aforementioned emitter and the aforementioned receiver have an active surface which has an essentially cylindrical general configuration (one of the shapes illustrated in FIGS. 4 to 7), with an axis parallel to the axis of the well.

The acoustic signals are emitted by transmitter T in the form of separated impulses and for each impulse one beam of acoustic rays having a well-defined angle of incidence $i$ as a function of the ratio of the speeds of propagation of the signals in the drilling mud and in the terrain at the level of the emitter T will be received by receiver R after penetration thereof into the ground where it is refracted by an angle $r$. The term "acoustic ray" is employed here and in the entire text hereinafter for the purpose of designating in reality a pencil-like acoustic ray having a very small opening angle, while the angles $i$ and $r$ correspond to the mean rays of the different incident and, respectively, reflected pencil-like beams of rays. The rays 1 and 2, 1' and 2' are the extreme rays of this beam in the plane of FIG. 1.

Since these rays reach the wall of the well in phase over the entire band of the wall, whose width is equal to the height $h_T$ of the emitter cylinder T, there are produced in the layers harmful interferences which are propagated along the paths, such as 3 and 3'. These interferences are accentuated at the reception since the receiver R receives the entire beam of acoustic rays returned at an angle $r$ by the entire band of the wall with a width $h_R$ equal to the height of the receiver cylinder R. The rays 4 and 5, 4' and 5' are the extreme rays of this beam in the plane of FIG. 1. These defects become aggravated under the conditions which have already been outlined above.

More particularly, even if the well is a cylinder of revolution, as in the example shown in FIG. 1 wherein the axis of the sounding or probing tool or instrument does not coincide exactly with that of the well, the interferences on the emitter-receiver paths are different for two distinct paths as a result of the difference in length of the total path between emitter and receiver; for example, for paths such as 2 – 3 – 5 and 1' – 3' – 4' (FIG. 1). The composition of the different signals received by the receiver R will in actual practice render impossible the accurate interpretation of the resulting signal.

Figure 2:
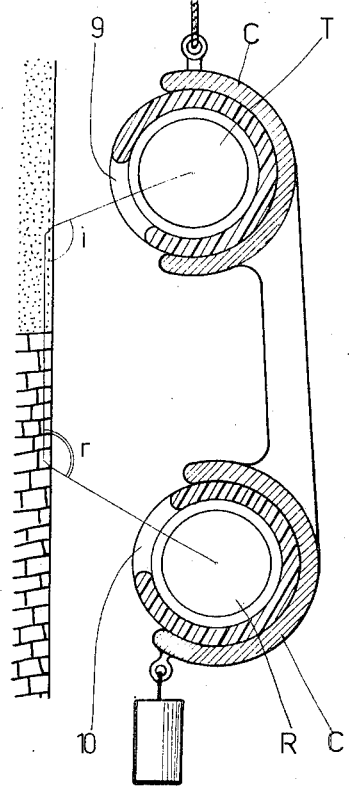
FIG. 2 is a schematic diagram of one example of a sounding instrument as proposed by the present invention.
Figure 2A:
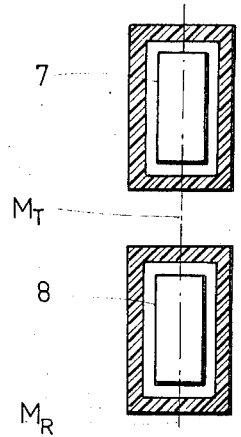
FIG. 2A is a vertical cross-sectional view of the sounding instrument shown in FIG. 2.

In contrast thereto, in a device such as proposed by the present invention, as shown in FIGS. 2 and 2A, the emitter T and the receiver R are disposed in a manner such that the mean cross-sectional plane $M_T$ of the cylindrical emitting surface 7 and the mean cross-sectional plane $M_R$ of the cylindrical receiving surface 8 are essentially coincident. FIG. 2 represents an example in which the centers of the emitter and of the receiver are not situated on the same vertical level, but this disposition or arrangement is by no means limiting.

Under these conditions, emitter T emits signals essentially following the radial directions of the cylindrical surface 7, and receiver R receives principally the signals directed along paths radial to the cylindrical surface 8. The receiver R receives but a single acoustic ray for each acoustic impulse being emitted, and the signal which is received is, as a consequence thereof, much purer than that furnished by a sounding or probing tool as shown in FIG. 1.

In the case of FIG. 2 in which the emitter T and the receiver R are disposed in proximity to a generatrix of the wall of the well, it will be preferable, in order to receive only the rays issued from the wall closest to the sounding instrument and for the purpose of avoiding thereby any risk of interference, to enclose the active cylinders of the emitter T and receiver R by means of a screen or cover C made from a material which absorbs the acoustic waves, without contact with these active cylinders, while providing in each screen or cover an opening large enough for the passage of the useful acoustic rays, such as the openings 9 and 10, respectively, taking into account any variations of the angles $i$ and $r$ according to the geological formations. The material used for making the screen or cover, which must also be able to withstand the hydrostatic pressure in the well, may, for example, by araldite in which small lead balls are provided.

The studies of the propagation of acoustic waves in the terrain traversed by a drilling well between an emitter and a receiver located one above the other indicate the ability to distinguish in connection with each emitted wave one component corresponding to a vibration of the rocks parallel to the axis of the well (longitudinal or compression wave) and one component corresponding to a vibration of the rocks perpendicular to the axis of the well (transverse or shear wave). Between the wall of the well and the transducer (emitter T or receiver R), each of these components causes the mud or sludge filling the hole to vibrate according to a longitudinal mode of vibration.

Figure 3:
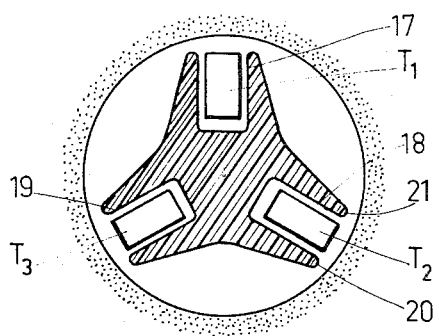
FIGS. 3 and 3A are, respectively, a cross-sectional view and an elevational view of one embodiment of the sounding instrument proposed by the present invention, adapted for the measurement of the dip angle of layers of terrain.
Figure 3A:
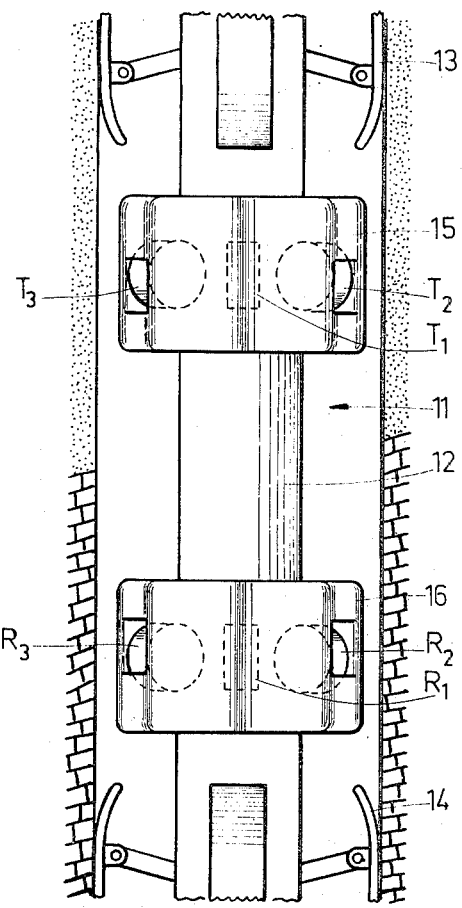

FIGS. 3 and 3A show the application of the present invention to the determination of the dip angle of layers of terrain. The sounding instrument illustrated therein comprises a sounding instrument body 11, shown in FIG. 3A, emitter transducers $T_1$, $T_2$, $T_3$, and receiver transducers $R_1$, $R_2$, $R_3$. The electronic emission and reception circuits have not been shown therein.

The body of the sounding instrument (FIG. 3A) comprises a central cylindrical mandrel 12 made from a rigid material so that the speed of the acoustic waves in this material is lower than the speed of these waves in the drilling mud. Disposed on the aforementioned mandrel are four centering blocks or supports, such as the support 13, above the sounding instrument, and four identical blocks or supports, such as the support 14, therebelow (FIG. 3A). There is disposed at the respective levels of the acoustic emitter transducers $T_1$, $T_2$, $T_3$ and the acoustic receiver transducers $R_1$, $R_2$, $R_3$ annular shoulder portions 15 and 16. Arranged in these shoulder portions are receptacles 17, 18, and 19 (FIG. 3) for the emitter and receiver transducers. This portion of the sounding instrument body must be machined to have the following characteristics: (1) the speed of the acoustic waves should be near the speed of these waves in the liquid bathing the transducer cylinder and (2) an elevated acoustic damping coefficient should be obtained. These two requirements have the purpose of avoiding the parasitic return of acoustic waves which would be reflected against the receptacle.

FIG. 3 represents a cross-sectional view through the body of the sounding instrument at the height or level of the shoulder portion 15 which is disposed for the mounting of the emitters $T_1$, $T_2$, and $T_3$. The receptacles 17, 18, and 19 may be closed by any suitable means which will not absorb the acoustic wave so that the drilling mud will not penetrate thereinto. In this case, the transducers can be surrounded by an acoustic absorbing material which constitutes a cover for this portion of the sounding instrument, except in a vertical sector where an acoustic window is provided which may either remain open or be closed by a material that will not essentially absorb the acoustic waves.

According to one embodiment of the present invention, the receptacle of the transducer is filled with oil. The material which constitutes the acoustic window must then be flexible enough to allow for the equalization of the pressures of the mud and of the oil bathing the transducer. It must have a portion which is conductive at a reference potential so as to assure the electrical insulation of the transducer. It must finally withstand corrosion, and could be, for example, an elastomer foil internally equipped with a conducting metallic lattice.

Figure 7:
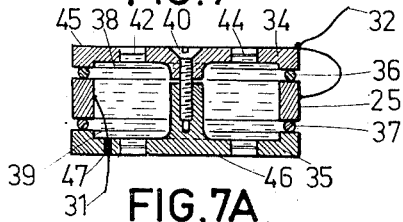
FIGS. 7 and 7A are an axial sectional view and a top view, respectively, of one example of an acoustic transducer in a sounding instrument according to the present invention.

Another possible embodiment will be described hereinbelow with reference to FIGS. 7 ane 7A, namely, an embodiment in which the receptacles of the transducers are not closed, the mud thus being permitted to bathe the transducers.

The active elements of the transducers are either solid cylinders (FIG. 4) or hollow cylinders (FIGS. 5 and 6) disposed in such a manner that the axes thereof are horizontal; in other words, so that these axes are positioned in a plane perpendicular to the drilling axis which is assumed to be vertical. The central vertical planes the three emitters $T_1$, $T_2$, and $T_3$ coincide on the axis of the sounding instrument and will form a two-by-two dihedra enclosing angles of 120°.

The annular shoulder portion 16 provided for the receivers has the same shape or configuration as that enclosing or surrounding the emitters. The receivers are moreover mounted in the same manner as the emitters. Furthermore, the mean cross-sectional planes of the active cylinders of emitter $T_1$ and receiver $R_1$ are coincident, like those of $T_2$ and $R_2$, $T_3$ and $R_3$.

As shown in FIG. 3, the receptacles 17, 18, and 19 arranged in each shoulder portion 15 and 16 have on both sides of each transducer a rounded-off ridge, such as the ridges 20 and 21 projecting from the transducer. These ridges have the function of protecting the transducers in case the sounding instrument should come to touch the wall of the well.

At each level of the well, the acoustic characteristics of the rocks are thus measured in three directions. The emission from emitters $T_1$, $T_2$, and $T_3$ is started simultaneously, and the corresponding signals being collected at receivers $R_1$, $R_2$, and $R_3$ respectively are recorded. The correlation of the diagraphs obtained, respectively, for the three pairs $(T_1, R_1)$, $(T_2, R_2)$, and $(T_3, R_3)$ makes it possible to detect an inclination of the layers of terrain and to measure the amplitude thereof according to a technique which is well known in this field.

Figure 4:
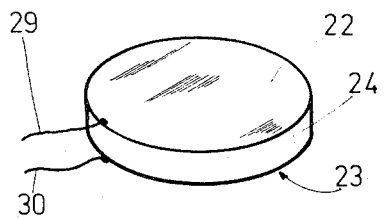
FIGS. 4 to 6 are diagrams of different types of acoustic transducers of known types, usable for forming the emitter and the receiver in a sounding instrument according to the present invention.
Figure 5:
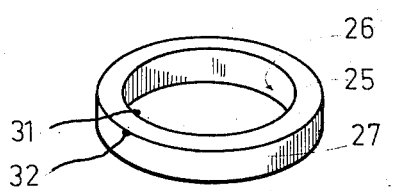
Figure 6:
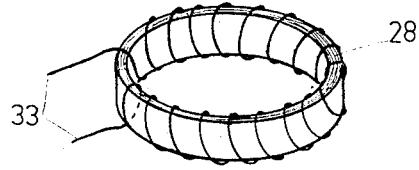

Whether they be emitters or receivers, the transducers may consist of either electrostrictive or magnetostrictive type devices (FIGS. 4 and 5; and FIG. 6, respectively). The base material of the electrostrictive transducers is a ceramic material available on the market, namely, a mixture of zirconate and lead titanate with the addition of rare earths. The Curie point of such ceramic materials is higher than 300° C. This property assures a good behavior of the electrostrictive characteristics to at least 200° C. and is thus suitable for the use of the transducers in petroleum wells where the temperature may reach this value at great depths.

The three emitters may have either identical or different emission frequencies. These frequencies may be comprised between 10 and 40 kHz.

When the active element of the emitter transducer is a solid electrostrictive cylinder 24 (FIG. 4), the electrical connections 29 and 30 thereof are assured by the fastening of input and output wires on the metallized plane faces 22 and 23 thereof.

Except in the sector where an acoustic window is disposed, the vibrations of the transducer are transmitted to its receptacle by the fluid in which this transducer bathes. These vibrations are absorbed by the receptacle by virtue of the material which is chosen to make up or constitute the receptacle. Particularly, the vibrations in a direction parallel to the axis of the cylinder are absorbed. The vibration emitted by the cylindrical surface 24 in a radial direction is therefore solely transmitted to the exterior medium, this vibration reaching only the acoustic window. Likewise, only those vibrations will reach the receiver which traverse the acoustic receiving window. Thus, only the cylindrical surface 24 of each transducer will actually behave as an emitter or receiver, respectively.

When the transducer is a hollow electrostrictive cylinder 25 (FIG. 5), the input and the output wires 31 and/or 32 are connected to the interior and to the exterior metallized faces 26 and, respectively, 27. When the transducer is of the magnetostrictive type (FIG. 6), it consists of a core 28, for example, made from iron cobalt or from iron silicon, on to which an electric wire 33 is wound. The ring is provided in a band or strip-like winding of several hundredths millimeter thickness.

When this transducer configuration (hollow cylinder), and irrespective of whether this transducer is electrostrictive or magnetostrictive, it is significant tha the vibrations emitted by the interior cylindrical face will be damped acoustically. For this purpose, an acoustical absorbing material must be placed at the inside of the transducer.

Figure 7A:
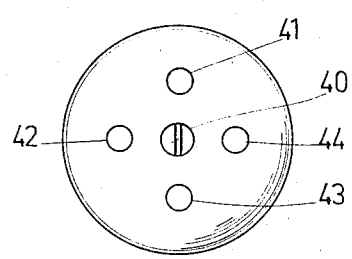

The embodiment of the present invention with the transducers being bathed by the mud may be used in practice with transducers having the form of a hollow cylinder. When the transducer is of the piezo-electric type shown in FIG. 5, the mounting or assembly thereof may be advantageously made as shown in FIGS. 7 and 7A.

In this type of assembly, the ring 25 is secured between two supports or plates 34 and 35. The fluid-tightness between the ring 25 and each support is assured by suitable annular seals 36 and 37. In this manner, the mud or sludge will not penetrate into the interior of the envelope constituted by the ring and the supports. The inner face of the supports 34 and 35 is covered with a layer (38, 39) of acoustical absorbing material. The securing or tightening of the supports may be assured by means of a screw 40. The interior of the envelope may contain either air or oil. In the latter case an equalization of the pressures prevailing inside and also on the outside may be obtained by using balancing membranes 41 to 44. The exterior face of the supports 34 and 35 (faces 45 and 46) is conductive. It may also be treated in the conventional manner so as to assure a protection against corrosion. The electrical connections 31 and 32 may be made as shown herein. The high tension wire 31 extends through one of the supports by means of a fluid-tight output orifice 47. The high tension wire 31 and the wire to ground 32 are connected to the electronic emission control system in the case of the emitters, and to the bottom or ground preamplifiers or input amplifiers in the case of the receivers, and specifically by means of fluid-tight terminals.

In the particular embodiment in which the active cylinder of the transducers is of the magnetostrictive type (FIG. 6), the cylinder 28 enclosed by the wire 33 can be clamped or clipped by winding of a conductive metallic band covered with an anti-corrosion material or agent, the unit then being placed directly in the drilling mud; the metallic band and the output wire of the coil is connected at one point to the reference potential. The inputs and outputs of the wire 33 are obtained by using fluid-tight terminals.

The electronic circuits of the sounding instrument may be disposed either within the body of the sounding instrument, or within fluid-tight cartridges adapted to the body of the sounding instrument. In the case of a sounding instrument having the type shown in FIGS. 3 and 3A, the electronic emission circuits will be conceived in a manner such that the three emitters $T_1$, $T_2$, $T_3$ are started successively and at a rate which is variable by at least one impulse every second, which means one impulse every 3 seconds for each emitter. There will be three conductors present for putting together the signals, one for each receiver.

What is claimed is:

1. An acoustic sounding instrument for determining acoustical characteristics of the earth surrounding a borehole, comprising:
   at least one acoustic emitter and at least one acoustic reciever spaced with respect to each other,
   said emitter including an active transducer element emitting acoustic signals principally radially from a curved, essentially cylindrical surface of revolution, and said receiver including an actice transducer element receiving the acoustic signals principally radially at a curved, essentially cylindrical surface of revolution,
   said emitting cylindrical surface and said receiving cylindrical surface being positioned with the mean cross-sectional planes thereof disposed essentially in the same longitudinal plane of said sounding instrument, wherein said emitter and said receiver each are enclosed in a cover made from a material capable of substantially absorbing the acoustic waves, said cover having at least one opening for the passage of the useful acoustic rays to said active transducer elements.

2. An acoustic sounding instrument for determining acoustical characteristics of the earth surrounding a borehole comprising:
   at least one acoustic emitter and at least one acoustic receiver spaced with respect to each other,
   said emitter including an active transducer element emitting acoustic signals principally radially from a curved, essentially cylindrical surface of revolution, and said receiver including an active transducer element receiving the acoustic signals principally radially at a curved, essentially cylindrical surface of revolution,
   said emitting cylindrical surface and said receiving cylindrical surface being positioned with the mean cross-sectional planes thereof disposed essentially in the same longitudinal plane of the sounding instrument, wherein said acoustic emitter comprises three emitters at a first level of said sounding instrument, and said acoustic receiver comprises three receivers at a second level of said sounding instrument, the mean cross-sectional pleanse of respective emitters and receivers being disposed essentially in three planes forming therebetween angles of 120°.

3. An acoustic sounding instrument for determining acoustical characteristics of the earth surrounding a borehole comprising:
   at least one acoustic emitter and at least one acoustic receiver spaced with respect to each other,
   said emitter including an active transducer element emitting acoustic signals principally radially from a curved, essentially cylindrical surface of revolution, and said receiver including an active transducer element receiving the acoustic signals principally radially at a curved, essentially cylindrical surface of revolution,
   said emitting cylindrical surface and said receiving cylindrical surface being positioned with the mean cross-sectional planes thereof disposed essentially in the same longtiudinal plane of the sounding instrument, wherein said emitter and said receiver each are enclosed in a cover made from a material capable of substantially absorbing the acoustic waves, each cover having at least one opening for the passage of useful acoustic rays to said active transducer elements, and wherein the active element of said emitter and that of said receiver are constituted of a cylindrical ring secured axially between two circular plate means capable of substantially absorbing the acoustic waves and a pair of fluid-tight annular seals disposed respectively between the cylindrical ring and each of said plate means.

4. An acoustic sounding instrument according to claim 3, wherein the inner space delimited by said ring and by said plate means is filled with an electrical insulating liquid, and in that at least one equalizing membrane disposed in at least one of said plates assures equality of hydrostatic pressure in the borehole and the pressure of said insulating liquid inside said transducer.

* * * * *